(12) United States Patent
Stott et al.

(10) Patent No.: US 6,205,188 B1
(45) Date of Patent: Mar. 20, 2001

(54) DEMODULATING DIGITAL VIDEO BROADCAST SIGNALS

(75) Inventors: Jonathan Highton Stott, Horley; Justin David Mitchell; Christopher Keith Perry Clarke, both of Crawley; Adrian Paul Robinson; Oliver Paul Haffenden, both of London, all of (GB); Philippe Sadot, Ville d'Avray (FR); Lauret Regis, Sonchamp (FR); Jean-Marc Guyot, Paris (FR)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/071,573

(22) Filed: May 1, 1998

Related U.S. Application Data

(60) Provisional application No. 60/054,195, filed on Jul. 30, 1997.

(30) Foreign Application Priority Data

| | | |
|---|---|---|
| May 2, 1997 | (GB) | 9709063 |
| Dec. 22, 1997 | (GB) | 9727112 |
| Dec. 22, 1997 | (GB) | 9727113 |
| Apr. 27, 1998 | (GB) | 9808989 |

(51) Int. Cl.[7] .................................................. H04L 27/06
(52) U.S. Cl. ........................ 375/344; 375/362; 370/503
(58) Field of Search ................................ 375/316, 344, 375/354, 355, 362, 340, 229; 370/480, 464, 498, 503, 520; 455/192.2, 192.3, 182.2, 182.3

(56) References Cited

U.S. PATENT DOCUMENTS 5,809,060 * 9/1998 Cafarella et al. ................ 375/146
5,953,636 * 9/1999 Keate et al. ........................ 455/3.2
5,970,397 * 10/1999 Klank et al. ....................... 455/139

FOREIGN PATENT DOCUMENTS

| | | |
|---|---|---|
| 2 296 165 | 6/1996 | (GB). |
| 2 307 155 | 5/1997 | (GB). |
| WO 95/05042 | 2/1995 | (WO). |

* cited by examiner

Primary Examiner—Stephen Chin
Assistant Examiner—Lenny Jiang (57) ABSTRACT

A demodulator suitable for implementation in a single chip for demodulating digital video broadcast signals including data modulated on a multiplicity of spaced carrier frequencies, wherein an input broadcast signal is converted to a frequency sufficiently low to enable analog to digital conversion of the signal, converter for converting the broadcast signal to a series of digital samples in complex format, transformer for analyzing the digital sample values to provide a series of data symbol values for each carrier frequency and signal processor including channel equalizer for receiving the signal values and providing an output for decoding, automatic frequency controller for controlling the frequencies of the digital sampling signals applied to the transformer, and timing synchronizer for synchronizing the transformer with the symbol periods of the broadcast signal, including correlator for receiving the digital signal values and including a delay having a time period equal to the active symbol period, and a multiplier for receiving the digital signal values and a version thereof delayed by the delay, to form a complex product signal, and a processor for processing the complex product signal to derive timing synchronization pulses, wherein the timing synchronizer is operable in an initial hunt mode for analyzing the digital sample values over a relatively wide timing range to establish synchronization, and then operable in a zoom mode for analyzing the digital sample values over a relatively narrow range about the synchronization point.

21 Claims, 8 Drawing Sheets

ARCHITECTURE OF THE DTTV INTEGRATED CIRCUIT

FIGURE 1

FIGURE 2 - ARCHITECTURE OF THE DTTV INTEGRATED CIRCUIT

OFDM SYMBOL COMPRISING ITS ACTIVE AND GUARD INTERVAL AND THIER RELATIONSHIPS.

PROPERTIES OF THE CORRELATION PRODUCT WITH TIME

FIGURE 5

PROPERTIES OF THE PRODUCT XY WITH FREQUENCY ERROR

FIGURE 6

FIGURE 7: TIMING SYNCHRONIZATION PROCESS

FIGURE 8: ZOOMING TIMING SYNCHRONIZATION PROCESS

FIGURE 9: TIMING SYNCHRONIZATION STATE MACHINE

FIGURE 10: TIMING PROCESSING IN HUNT STATE MODE

HIGH PASS FILTER
IMPLEMENTATION

FIGURE 13

IIR INTER
SYMBOL FILTER
IMPLEMENTATION

FIGURE 14

FIGURE 15: ADAPTIVE SLICER IMPLEMENTATION

FIGURE 16: COARSE PULSE PROCESSOR IMPLEMENTATION

FIGURE 18

FIGURE 17: SYMBOL COUNTER IMPLEMENTATION

DEMODULATING DIGITAL VIDEO BROADCAST SIGNALS

This application claims priority from U.S. provisional application No. 60/054,195, filed Jul. 30, 1997.

This invention relates to demodulating digital video broadcast (DVB) signals.

There are currently two major types of DVB, namely, terrestrial broadcasting and satellite/cable broadcasting. The invention is particularly, though not exclusively concerned with terrestrial broadcasting, which has special problems, particularly in communication channel impairment, arising from adjacent television channels, multipath, and co-channel interference, for example. A type of transmission which has been developed to meet these problems is known as Coded Orthogonal Frequency Division Multiplexing (COFDM)—see for example "Explaining Some of the Magic of COFDM" Stott, J. H.—Proceedings of 20th International Television Symposium, Montreux, June 1997. In COFDM, transmitted data is transmitted over a large number of carrier frequencies (1705 or 6817 for DVB) occupying a bandwidth of several MHz in the UHF spectrum, spaced (by the inverse of the active symbol period) so as to be orthogonal with each other; the data is modulated as QPSK or QAM and convolutionally coded, to enable soft-decision (Viterbi) decoding. Metrics for COFDM include Channel State Information (CSI) which represents the degree of confidence in each carrier for reliably transmitting data.

Modulation and Demodulation of the carriers may be carried out by a Fast Fourier Transform (FFT) algorithm performing Discrete Fourier Transform operations. Naturally, various practical problems arise in demodulation, firstly in translating the transmitted signal to a frequency at which demodulation can be carried out, and secondly by accurately demodulating the data from a large number of carriers in a demodulator which is not overly complex or expensive, which involves inter alia synchronizing the demodulator (receiver) in time to the incoming signal. This is important for the proper execution of the FFT algorithms.

The data signal on each carrier has a relatively long symbol period and this, in part, gives the signal its good performance in conditions of multipath propagation. The multipath performance is further enhanced by the inclusion of a guard interval in which a portion of the modulated signal waveform taken from the end of each symbol is also included at the beginning of the symbol period. Different fractions of the basic symbol period, can be used in this way to provide immunity to multipath distortion of increasingly long delays.

The principal requirement for synchronization in a receiver is to obtain from the signal waveform a reliable time synchronization pulse related to the start of the symbol period. Such a pulse is then used to start, at the correct position in the waveform, the process of Fourier Transformation which accomplishes a major portion of the demodulation process. A second requirement for synchronization is to lock a digital sampling clock for analog to digital conversion in the receiver to an appropriately chosen harmonic of the symbol period. However, the modulated OFDM waveform produced by adding together all the modulated carriers is essentially noise-like in nature and contains no obvious features such as regular pulses which could be used to synchronize the circuitry receiver. Because of this, techniques for synchronization are based on correlation of the signal with a version of itself delayed by the basic symbol period. The similarity between the portion included to form the guard interval and the final part of the basic symbol is then shown as a region of net correlation while the remainder of the symbol period shows no correlation. Even so, the correlated waveform still reflects the noise-like nature of the signal waveform and can be impaired by signal distortions, so it is necessary to process the signal further to obtain reliable synchronization.

British patent application GB-A-2037155 describes time synchronization involving the use of correlation and a filter which exploits the periodicity of the waveform to form a complex symbol pulse. The modulus of the pulse signal is used to derive a pulse related to the start of the symbol period and a signal to control a sampling clock frequency in the demodulator.

An implementation of such an arrangement in the 8K mode of COFDM would require about 369 Kbits of memory, which is far too great for implementation in a single chip.

SUMMARY OF THE INVENTION

It is an object of the present invention to provide a demodulator for digital terrestrial broadcast signals which can demodulate data transmitted by a COFDM system but which may be manufactured simply and inexpensively, preferably in a single integrated circuit chip.

The present invention is based on the recognition that in addition to timing synchronization, correct demodulation requires inter alia both automatic frequency control (AFC) and channel equalization (CE), both of which have memory requirements, but neither of which processes can be initiated until the timing synchronization process is locked. The present invention envisages using the memory intended for use by AFC and/or CE in an initial hunt mode to establish synchronization where a large amount of memory is required to hunt over a wide timing range, and then subsequently maintaining synchronization in a zoom mode, where only a narrow timing range about the synchronization point is checked for timing variation, requiring a small amount of memory. In the zoom mode, AFC and CE may come into operation, making use of the memory no longer required by timing. Should synchronization be lost in the zoom mode, the system reverts to hunt mode, with suspension of AFC and CE.

The present invention provides in a first aspect, apparatus for demodulating digital video broadcast signals comprising data modulated on a multiplicity of spaced carrier frequencies, including:

conversion means for converting the broadcast signal to a series of digital samples in complex format, transform means for analyzing the digital sample values to provide a series of data symbol values for each carrier frequency and signal processing means including channel equalisation means for receiving the signal values and providing an output for decoding, automatic frequency control means for controlling the frequencies of the digital sampling signals applied to said transform means, and timing synchronization means for synchronizing the transform means with the symbol periods of the broadcast signal, including correlation means for receiving said digital signal values and comprising delay means having a time period equal to a symbol period, and multiplier means for receiving the digital signal values and a version thereof delayed by said delay means, to form a complex product signal, and means for processing the complex product signal to derive timing synchronization pulses, wherein the timing synchronization means is operable in an initial hunt mode for analyzing said digital sample values over a relatively wide timing range to establish synchronization, and then operable in a zoom mode for analyzing the digital sample values over a relatively narrow range where the synchronization point pulse is expected.

Usually, the relatively wide timing range will be a symbol period, preferably a full OFDM sampling period.

In a further aspect, the invention provides a method of demodulating digital video broadcast signals comprising data modulated on a multiplicity of spaced carrier frequencies, including:

converting the broadcast signal to a series of digital sample values in complex format, transforming the digital sample values to a series of data symbol values for each carrier frequency.

synchronizing the transform means with the symbol periods of the broadcast signal, including correlating said digital signal values by multiplying the digital signal values and a version thereof delayed by a time period equal to a symbol period, to form a complex product signal, and processing the complex product signal to derive timing synchronization pulses, wherein the timing synchronization is carried out in an initial hunt mode, analyzing said digital sample values over a relatively wide timing range to establish synchronization, and the timing synchronization then being carried out in a zoom mode, analyzing the digital sample values over a relatively narrow range about the synchronization point, and processing the data symbol values, including channel equalizing the data symbol values to provide an output for decoding, and automatically controlling the frequencies of the digital sampling signals applied to said transform means.

BRIEF DESCRIPTION OF THE DRAWINGS

A preferred embodiment of the invention will now be described with reference to the accompanying drawings, in which.

DESCRIPTION OF THE PREFERRED EMBODIMENT

The preferred embodiment of the present invention comprises a front end for digital terrestrial television transmitted according to the DVB-T specification. The front end consists of two separate components. First, an analog down-converter that converts the input signal from UHF to a low IF. Second, an integrated circuit chip that accepts the analog signal from the down-converter and performs the required DSP operations, which include synchronization and demodulation, to form a stream of soft decisions suitable for presentation to an FEC decoder (Forward Error Correction decoder).

Full compliance to the DVB-T specification means that the chip is capable of decoding signals transmitted in the following modes:

1) A signal that contains either 1705 or 6817 active carriers, commonly referred to as 2K and 8K respectively. The chip includes the functionality and memory required to perform the FFT algorithm in both modes.
2) Non-hierarchical QPSK, 16-QAM and 64-QAM constellations.
3) Hierarchical 16-QAM and 64-QAM constellations, either uniform or non-uniform with the possible scale factors $\alpha=2$ and $\alpha=4$.
4) Guard intervals ¼, ⅛, 1/16 and 1/32 of the OFDM symbol length.
5) Viterbi code rates ½, ⅔, ¾, ⅚ and ⅞.

Figure 1:
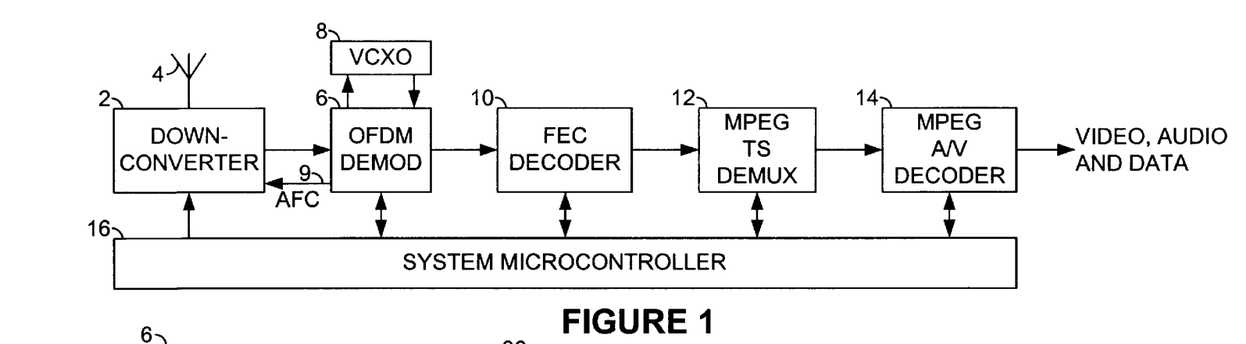
FIG. 1 is a schematic block diagram of a digital terrestrial front end converter incorporating the present invention.

Referring now to FIG. 1, a block diagram of the front end system, a down-converter 2 receives the input UHF broadcast signal from an antenna 4 and converts the carrier signal to a first IF frequency of 30–40 MH and then to a second IF frequency of 4.57 MHz. Since the bandwidth of the modulated data is about 7.6 MHz, this second IF signal is sufficiently low in frequency to present the signal as a base band signal to a demodulator chip 6. Demodulator chip digitises the incoming signal at a rate determined by a voltage controlled oscillator 8, and provides an Automatic Frequency Control on a line 9 to down-converter 2. The output of demodulator 6 represents demodulated data and is fed to a FEC decoder 10 (Forward Error Correction or Viterbi decoder) for recovering the data. The decoded data is fed to a transport stream demultiplexer 12 and then to an audio-visual decoder 14. The front end is controlled by a system microcontroller 16.

Figure 2:
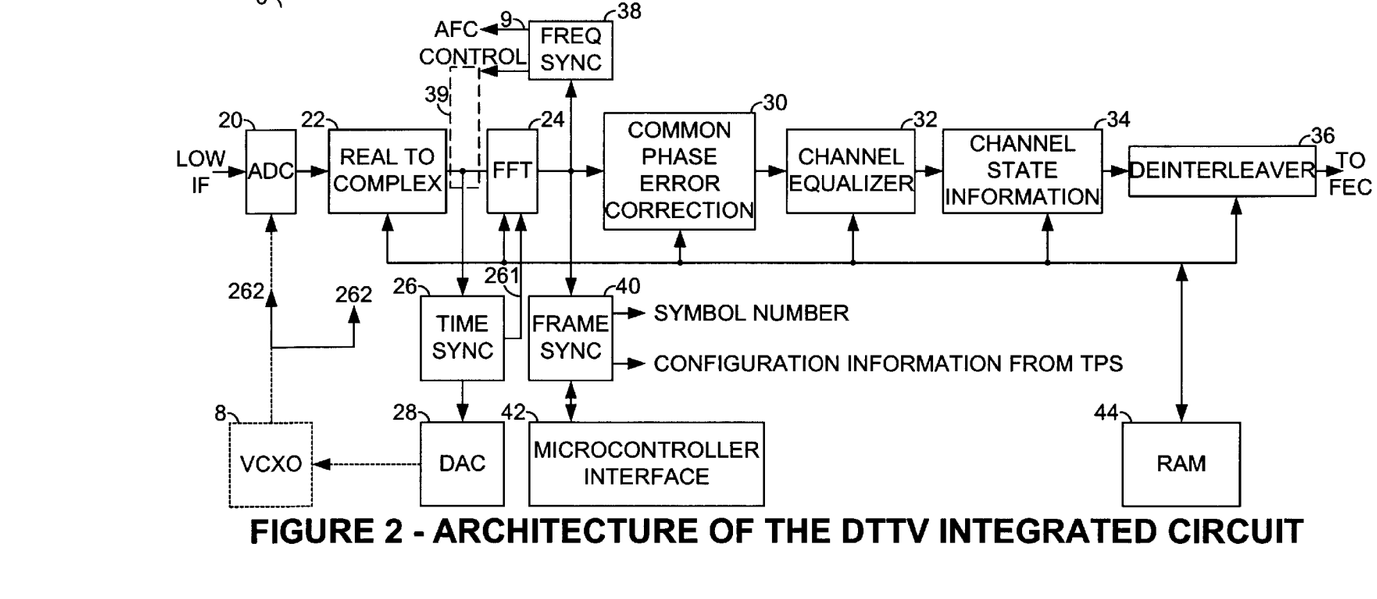
FIG. 2 is a more detailed block diagram of demodulating apparatus according to the invention forming part of the converter of FIG. 1.

Referring now to FIG. 2, this shows the demodulator chip 6 in more detail. The chip itself is shown schematically in FIG. 3. The low second IF is fed to an analog digital converter which samples the IF signal at a frequency of 18.29 MHz (×4 the second IF frequency of 4.57 MHz), in an analog to digital converter 20. The digital output samples are fed to a real to complex converter 22 which converts the digital samples to complex number values in order to provide a complex signal centred on zero frequency. This signal is fed to a Fast Fourier Transform device (FFT) 24 and to a timing synchronization unit 26 which derives timing synchronization pulse from the complex input signal which is fed on line 261 to FFT 24. A frequency error signal is fed to a digital to analog converter 28 to supply an analog control voltage to a voltage controlled oscillator 8, which provides a sampling clock signal on line 262 to analog to digital converter 20, and the remaining units in the signal processing chain.

The FFT device 24 has four modes of operation. Firstly, it is capable of performing either a 2048 point or an 8192 point transform. Second, it is capable of performing the transform in either direction. The inverse FFT functionality is provided so that the integrated circuit may be used in applications requiring OFDM modulation. In any event, the FFT performs a series of discrete Fourier transforms on each carrier frequency to provide at an output the data symbols for each carrier frequency. These output signals are corrected in phase at a common phase error generator unit 30 and then passed to a channel equaliser 32, a channel state information unit 34 and a deinterleaver 36. The signal thus processed is then passed at an output from the demodulator to forward error correction unit 10. The phase error correction block 30 calculates the common phase error of the signal and applies the necessary correction. The channel equalizer 32 first performs linear temporal equalization followed by frequency equalization using a high order interpolating filter. The equalizer outputs an equalized constellation to the channel state information unit 34. Unit 34 generates 3 or 4 bit soft decisions which are suitable for presentation to a Viterbi decoder. Deinterleaver 36 performs firstly symbol deinterleaving followed by bit deinterleaving.

In addition, the output signals from FFT 24 are passed to a frequency synchronization unit 38 which converts it to a control signal on line 9 for automatic frequency control, which acts upon a local oscillator in down-converter unit 2 for adjusting the frequency of the first or second IF. As an alternative, unit 38 may control a DDFS unit 39 (indicated in dotted lines) to compensate digitally for the frequency drift by centering the signal around 0 Hz.

In addition, the output of FFT 24 is fed to a frame synchronization unit 40. A microcontroller interface 42 is provided, and in addition RAM memory 44 is provided to which all the units 22, 24, 30–36 have access to in order to provide their required operations.

Temporal Response versus Noise Averaging in Channel Equaliser 32

The signal from the FFT is affected by all the impairments caused by the channel; for example, in the presence of a single echo, the FFT output will suffer from frequency selective fading. The purpose of the channel equalizer 32 is to rotate and scale the constellation so that the constellations on all the carriers are of a known size (but not necessarily of the same reliability). the process is performed by using the scattered pilot information contained in the COFDM signal. The scattered pilots provide a reference signal of known amplitude and phase on every third OFDM carrier. Since this scattered pilot information is subject to the same channel impairments as the data carriers, the scattered pilots are noisy.

In the present invention, linear interpolation is performed between two received scattered pilots, and these interpolated values are used as the reference to equalize the data. Since scattered pilots at the same time duration are spaced 4 OFDM symbols apart, a compensating data delay of 3 OFDM symbols must be provided to permit this option.

Automatic Frequency Control (AFC) and Common Phase Error (CPE) Correction

The addition of local oscillator phase noise to an OFDM signal has two principal effects:

1) To rotate the received constellation by an amount which is the same for all carriers within one OFDM symbol, but varying randomly from symbol to symbol. This is called the common phase error (CPE) and primarily results from the lower-frequency components of the phase-noise spectrum; and 2) To add Inter-Carrier Interference (ICI) of a random character similar to additive thermal noise. ICI primarily results from the higher frequency components of the phase-noise spectrum. ICI cannot be corrected and must be allowed for in the noise budget. It can be kept small in comparison with thermal noise by suitable local oscillator design.

It is possible to remove the common phase-error component caused by phase noise added in the down-converted by digital processing in the chip. This processing is performed by the common-phase-error correction block 30.

The common-phase-error correction block 30 is able to remove the common phase error because all carriers within a given symbol suffer the same common phase error. By measuring the continual pilots, whose intended phase is the same from symbol to symbol, the common phase error is determined and then subtracted from the phase of all the data cells in the same symbol. There are sufficient continual pilots (which in any case are transmitted with a power approx. 2.5 dB greater than data cells) that the effect of thermal noise on this measurement can be rendered negligible by averaging.

As explained above, AFC is necessary, for strict control over the frequency of the down-converted broadcast signal. This control may be exerted over the local oscillator in the down-converter, or by means of a DDFS 39 prior to the FFT unit 24. In the present invention it is recognized that the frequency error may be determined by computing phase variation between adjacent symbol intervals in continual pilot signals (see our copending application GBP12427A), a first phase difference representing fine frequency error (less than one carrier spacing) and a rate of change of phase difference (second phase difference) being used to determine coarse frequency error (number of whole carrier spacings offset) Thus two delay elements, in which consecutive data symbols are held, are required to compute the second phase difference. In addition, the computed first phase difference is employed for CPE correction.

Figure 3:
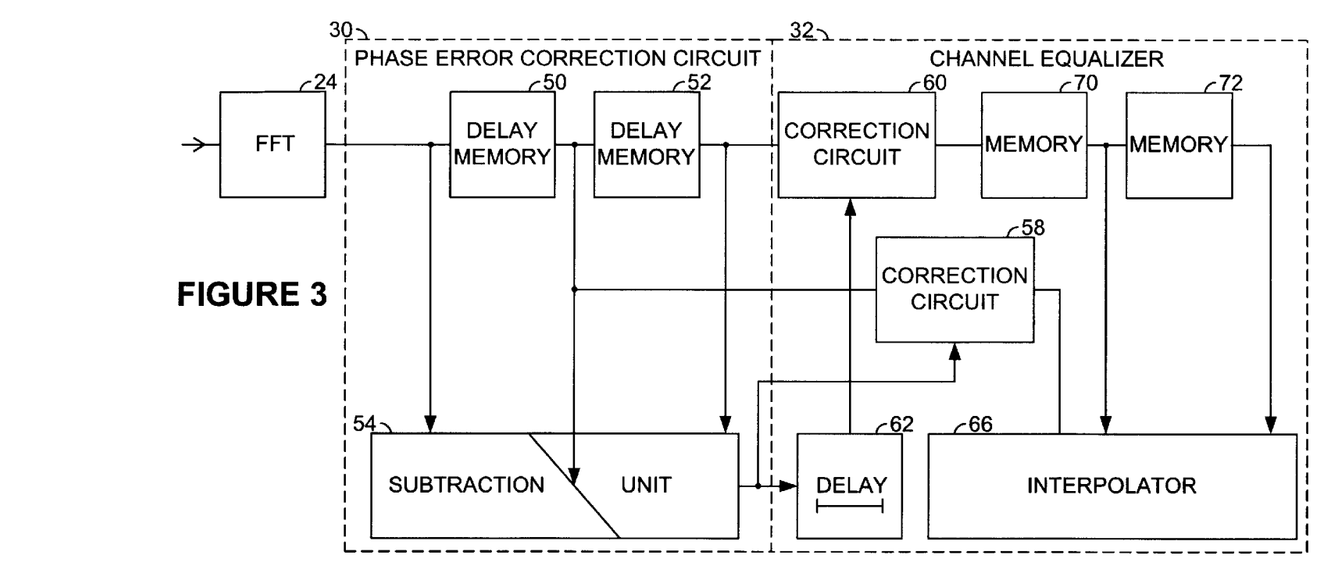
FIG. 3 is a more detailed block diagram of automatic frequency control and channel equalization units of FIG. 2.

Referring now to FIG. 3, this shows a more detailed block diagram of the common phase error correction circuit 30 and channel equaliser 32. The common phase error correction circuit 30 receives an output from FFT 24 which is applied to first and second delay elements 50, 52, each being 16K memory locations for holding 8K data symbols in complex format. Signals from the inputs and outputs of delay elements 50, 52 are provided to subtraction circuits in a unit 54 in order to derive phase error signals. These phase error signals are employed for fine frequency error correction. The assessed common phase error is applied to correction circuits 58, 60, the output to correction circuit 60 being applied via a further delay element 62. The signal outputs from memory elements 50, 52 are thus corrected for phase in circuits 58, 60, and are applied to an interpolator 66 in channel equaliser circuit 32. The output circuit from correction circuit 58 is applied directly to the interpolator, but the signal from correction circuit 60 is applied to the interpolator firstly directly at a tapping and then via first and second memory elements 70, 72, each of 6252×20 bits symbols in complex format. Thus, although as explained above a three symbol delay is necessary in order for CE to operate on scattered pilots, only two delay elements are required, since the third delay is provided by element 62.

A significant problem for demodulator integrated circuit 6 is the amount of RAM that the chip requires.

It is necessary to make the best possible use of the RAM. Some of the blocks of memory, such as the FFT and symbol deinterleaver, require fixed amounts of RAM and it is not possible to reduce them (except by reducing the word widths and so degrading the performance). The timing synchronization however is designed for reducing the amount of memory but without degrading the performance.

Timing Synchronisation

Figure 4:
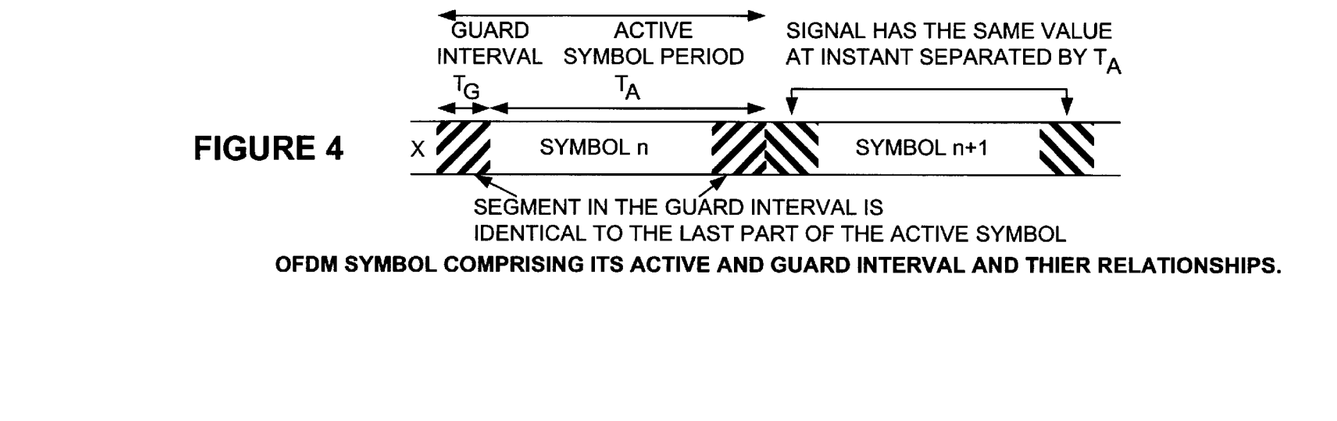
FIG. 4 is a diagram of adjacent OFDM symbols having active and guard intervals.

Coded Orthogonal Frequency Division Multiplexing (COFDM) has been specified for terrestrial television as defined in the DVB-T ETSI specification. The OFDM symbol produced by adding all the modulated carriers is essentially noise like in nature and contains no obvious features such as regular pulse which could be used to synchronize the receiver. The addition of the guard interval is the key to the usefulness of COFDM in multipath environment. It is also the key to the proposed synchronization method. As shown in FIG. 4, each OFDM symbol is extended by a period $T_G$ (or $\Delta$) (the guard interval) which precedes the useful or active symbol period $T_A$, so that the whole symbol now lasts $T_S$ in total. $T_A$ is the reciprocal of the carrier spacing $F_A$, and is the duration of the time domain signal analyzed by the fast Fourier Transform. Each carrier is continuous over the boundary between the guard interval and the active part of the same symbol, keeping the same amplitude and phase. If we consider the signal as complex baseband, with all the carriers not only spaced by $F_A$ but also equal to multiple $F_A$, then the signal in the guard interval is effectively a copy of the segment of the signal occupying the last $T_G$'s worth of the active part. It follows that the signal has the same value at any instant which are separated by $T_A$ but lie within the same symbol.

Figure 5:
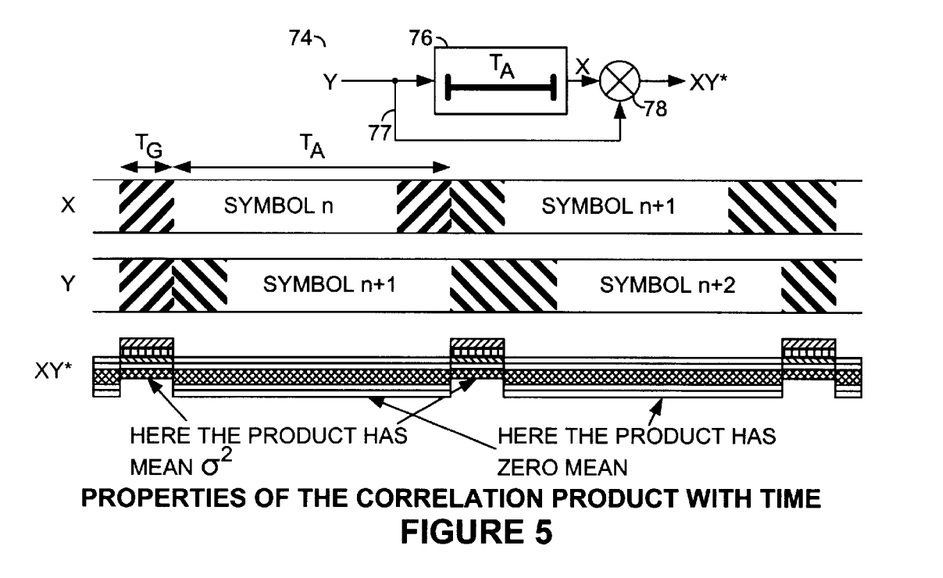
FIG. 5 is a block diagram of a correlator unit for extracting timing information, together with waveform diagrams showing its principle of operation.

The similarity between the portion included to form the guard interval and the final part of the basic symbol is then shown as a region of net correlation while the remainder of the symbol period shows no correlation. Because of this, techniques for timing synchronization are based on, correlation of the signal with a version of itself delayed by the active symbol period. A correlator 74 is shown in FIG. 5, comprising a one symbol delay 76 and a feed forward path 77 coupled to respective inputs of a complex multiplier 78.

The correlator takes the complex baseband signal Y, delays it by $T_A$ and multiplies the delayed version X with the complex conjugate of Y to form the product XY*. For those instants where the two samples X and Y belong to the same symbol, then the mean of the product XY* is proportional to $\sigma^2$ (the square of the variance); otherwise, the two samples X, Y being independent, the product XY* has zero mean. Because the output XY* of the complex multiplier is noisy (see FIG. 5), it is necessary to filter to make visible the underlying pulse structure before the slicing process to detect the symbol pulse.

Figure 6:
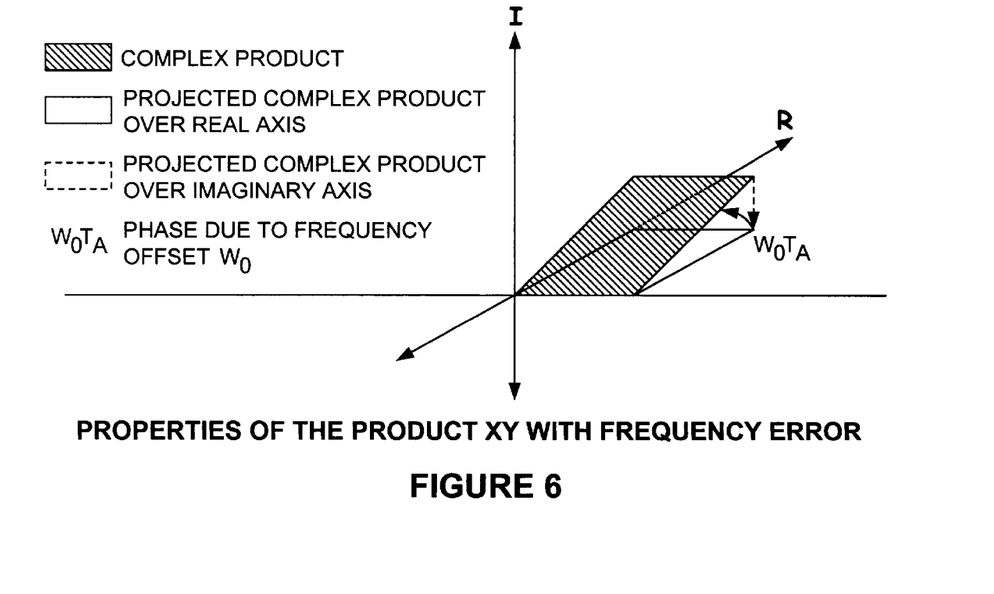
FIG. 6 is a schematic diagram of a complex pulse recovered from the correlator.
Figure 7:
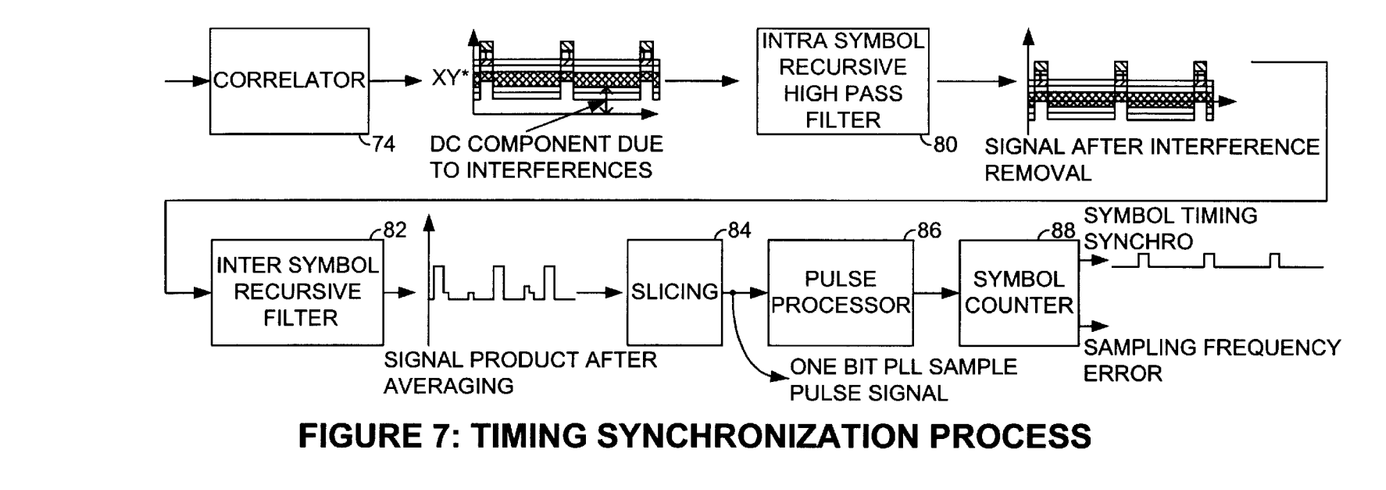
FIG. 7 is a block diagram together with appropriate waveform diagrams of one form of timing synchronization employed for carrying out the present invention.

An implementation is shown in FIG. 7. Two types of filter are used. The first filter, a recursive high pass filter 80 is included to remove the arbitrary DC component introduced when an OFDM signal experiences interferences. The second filter, an inter symbol recursive filter 82 reduces the noise component by averaging the signal value from one symbol to another. After these two filters, slicer 84 extracts the timing information in a way that it can be used to control the loop governing the sampling frequency and symbol timing. Because the timing synchronization process takes place before frequency control, possible frequency offset caused by tuner error may occur. The complex filtered signal product input to slicer 84 is a complex pulse shape signal, as shown in FIG. 6. This complex filtered signal product is effectively projected over the real and imaginary axes in slicer 84. The magnitudes of the real and imaginary projections are compared and the larger one is chosen. The selected one is then sliced and further processed to check and isolate the leading edge of the pulse.

This sample pulse is then fed to a pulse processor 86 which generates a single pulse at the leading edge of the pulse and prevents the generation of spurious pulses. The timing of pulses produced by the pulse processor 86 is compared with the timing of pulses produced from the sampling clock frequency in a symbol counter 88. The comparison produces an error signal "sampling frequency error" applied to oscillator 8 FIG. 2).

The correlation function is performed over a full active period of the OFDM symbol; in 8K mode, a full version of the delay line in the correlator would require up to 8192 complex samples store locations (each of 20 bits) leading to a large memory of 163840 bits.

The inter symbol recursive filter performs its averaging over a full symbol period (active+guard interval period). In 8K mode with a guard interval of one quarter of the active period this results to 10240 complex samples per OFDM symbol, each complex samples of 20 bits, 12 bits for both real and imaginary parts, leading to a memory requirement of 204800 bits. Thus, a full version of the timing algorithm requires about 369 Kbits of memory.

Some architecture trade-offs and some algorithm alterations in the timing synchronization are necessary for the sole purpose of reducing this huge amount of memory but without degrading the performance.

Figure 8:
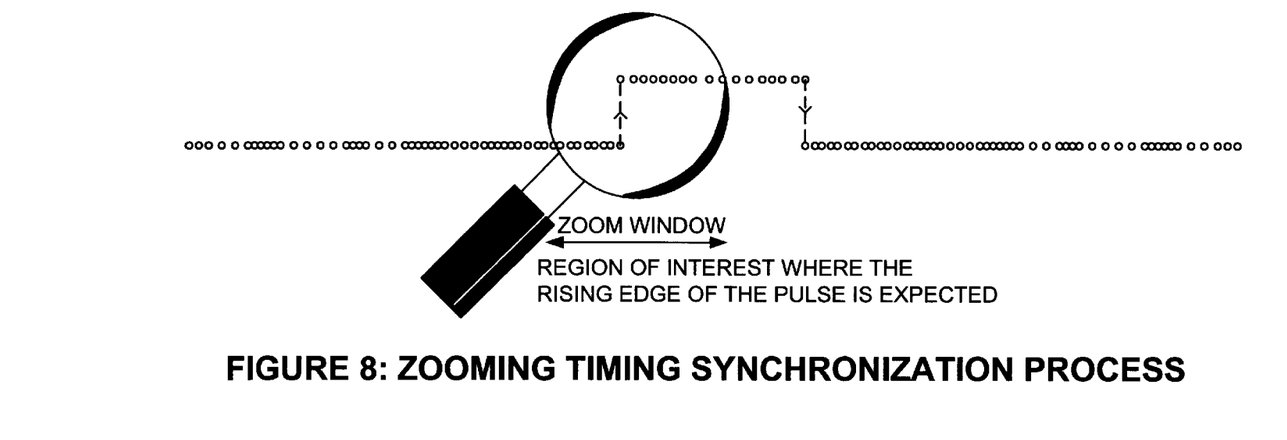
FIGS. 8 and 9 are diagrams illustrating the principle underlying the present invention.

To reduce dramatically this memory and still keeping the same performance, the timing synchronization in accordance with the invention consists of two processes, an initial HUNT and a subsequent ZOOM process, as illustrated in FIG. 8.

Figure 9:
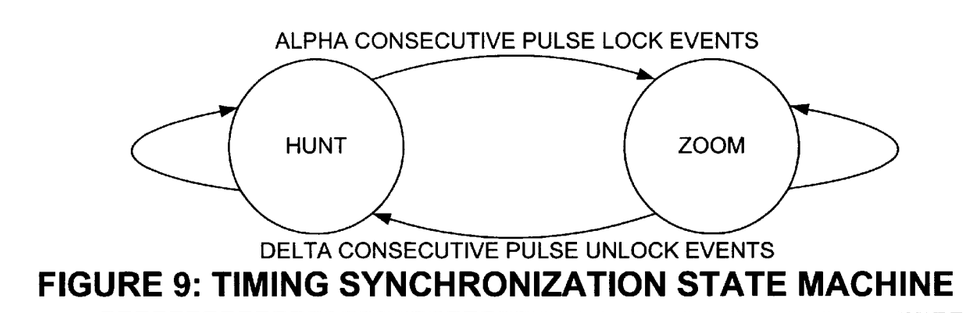

The estimation of the frequency offset in AFC requires two OFDM symbol delays of memory, each memory of 6911 words of 20 bits whereas the Channel Equalizer for the channel response estimation requires two OFDM symbol memories, each of 6252 words of 20 bits. As the Frequency Synchronization and the Channel Equalizer units cannot work properly until the Timing Synchronization has reached its steady state, these memories are to the timing synchronization process in order to perform the beginning of the Timing Synchronization operations. Once the Timing Synchronization process has reached its perform convergence point the Timing processing will zoom only around the region of interest where the rising edge of the correlated signal is supposed to be located, resulting in a much smaller memory requirement, the frequency synchronization and the channel equalizer memories being given back to their respective units. If the timing synchronization gets lost (unlock state), then the Frequency Synchronization and Channel Equalization memories would be reallocated to the Timing Synchronization process. The zoom technique employed for the Timing Synchronization process is illustrated in FIG. 9.

The Timing Synchronization process according to the invention consists in two states, the HUNT timing synchronization state, and the ZOOM timing synchronization state. In the HUNT state, the timing process is not locked, and the timing process tracks the rising edge of a correlated signal pulse. The state machine moves from HUNT to ZOOM when ALPHA consecutive pulse lock events occur otherwise stay in the HUNT state. In the ZOOM state, the timing process is pulse locked (the guard interval is properly detected and does not move). In ZOOM state, the state machine goes back to HUNT state when DELTA consecutive pulse unlock event occurs. In practice, ALPHA and DELTA are usually less than 10, say 4 or 5, and are preferably programmable.

In the HUNT state, the timing synchronization process is unlocked and a rising edge pulse is tracked in the correlation signal. The timing process performs correlation and the filtering over the full OFDM signal with all the necessary memories located in the Frequency Synchronization and Channel Equalizer units. The full 8K memory needed for the correlation operation is allocated to the first delay element 50 (FIG. 10) and a part of the second delay element 52 of the frequency synchronization while the 10K memory needed for recursive inter symbol filtering is allocated to the first delay element 70 and a part of the second delay element 72 of the channel equalizer unit.

Only after ALPHA consecutive events confirming that the timing synchronization process has properly detected the rising edge of the correlated signal (Pulse locked condition) than the timing process moves from HUNT to ZOOM state, otherwise the timing stays in the HUNT state.

Figure 11:
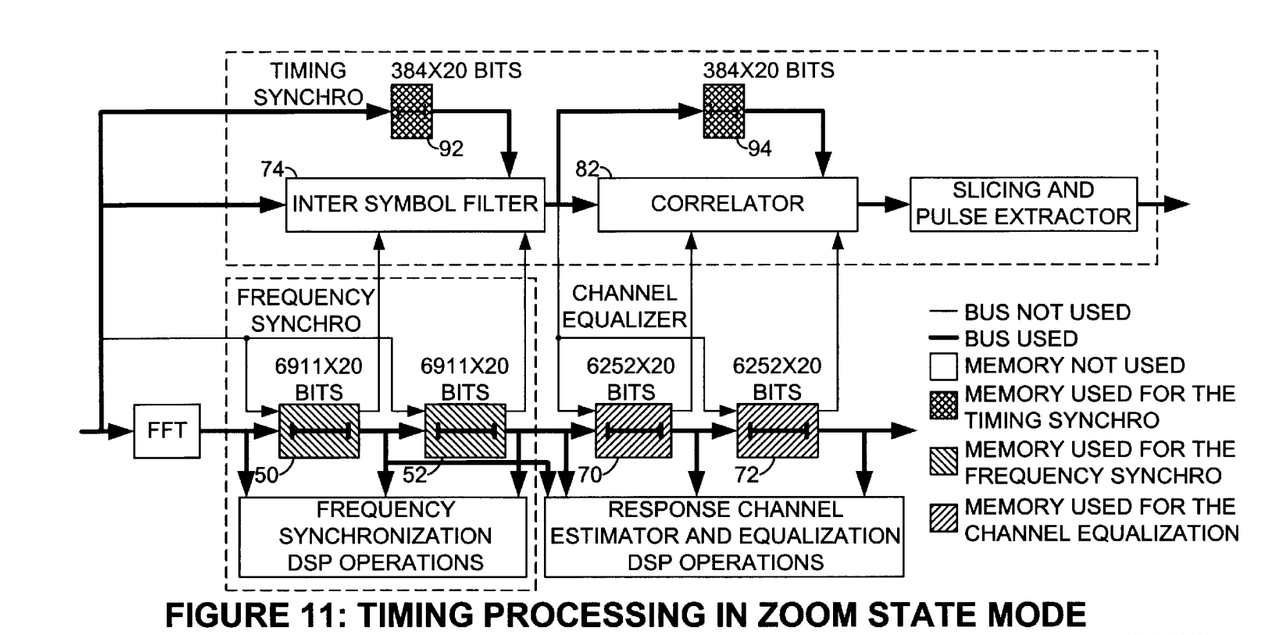

In the ZOOM state mode (FIG. 11), the timing synchronization is pulse locked since the region of interest where the rising edge of the pulse is sitting is properly detected. In this mode, all the memories are given back to their respective units, the frequency synchronization and channel equalizer. Only two small buffers 92, 94 each of 384 words of 20 bits for the correlation and the inter symbol filtering reside in the timing synchronization unit. After DELTA consecutive loss of pulse synchronization, the timing synchronization process goes back to the HUNT state mode where the Frequency Synchronization and Channel Equalizer memories are reallocated to the timing process. FIG. 11 illustrates the dataflow processing with the memory usage when in ZOOM state mode.

Figure 12:
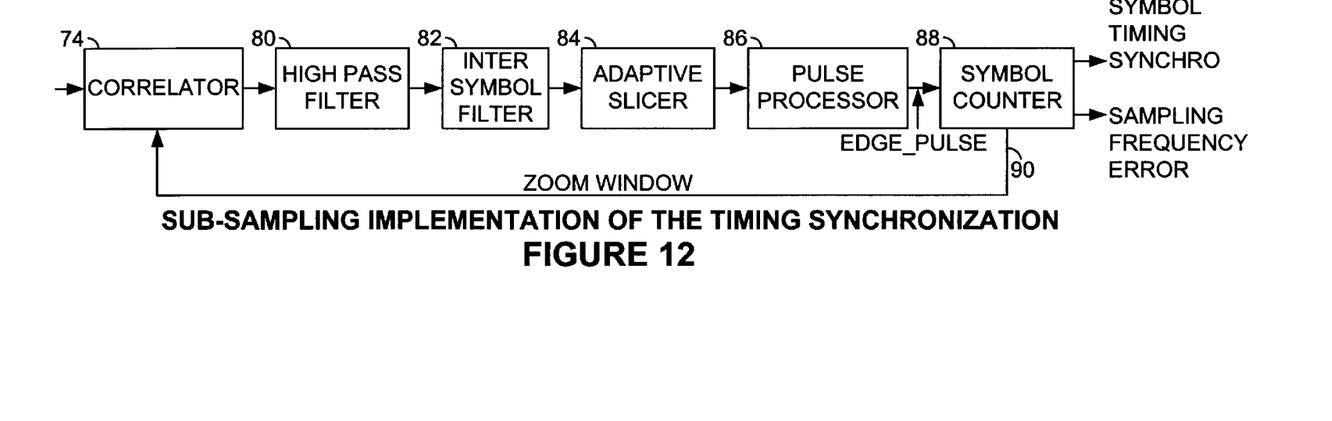
FIG. 12 is a block diagram of timing synchronization apparatus according to the present invention.

The preferred embodiment as shown in FIG. 12 includes a correlator 74, operating on a full version (HUNT state) or only on a subset (ZOOM state) of the signal (3 time slots—384 samples), performs the correlation between the delayed version of the noisy-like OFDM signal and its complex conjugate.

The high pass recursive filter 80 operating on all samples removes the offset caused by interference. This is followed by a IIR symbol filter 82 operating over a full version (HUNT state) or only over a subset (ZOOM state) of the signal which exploits the periodic nature of the waveform to suppress noise and other impairments to produce a rectangular pulse, the duration of which is related to the guard interval.

Then the adaptive slicer 84 projects the incoming complex input along the four axes (real, -real, imaginary, -imaginary), compares the four axis values, choose the larger one and then slices its at a predetermined value. The OneBit signals from the adaptive slicer unit is finally passed to the pulse processor unit 86 which check and isolate the desired leading edge of the correlation pulse. Finally, the Edge_Pulse signal produced by the pulse processor unit is presented to the symbol counter 88. The role of the symbol counter is to obtain both the sampling frequency and the symbol timing synchronization. The symbol counter provides a zoom window signal on line 90, the Start pulse for the FFT processing and the sampling frequency error for external analog oscillator.

Figure 10:
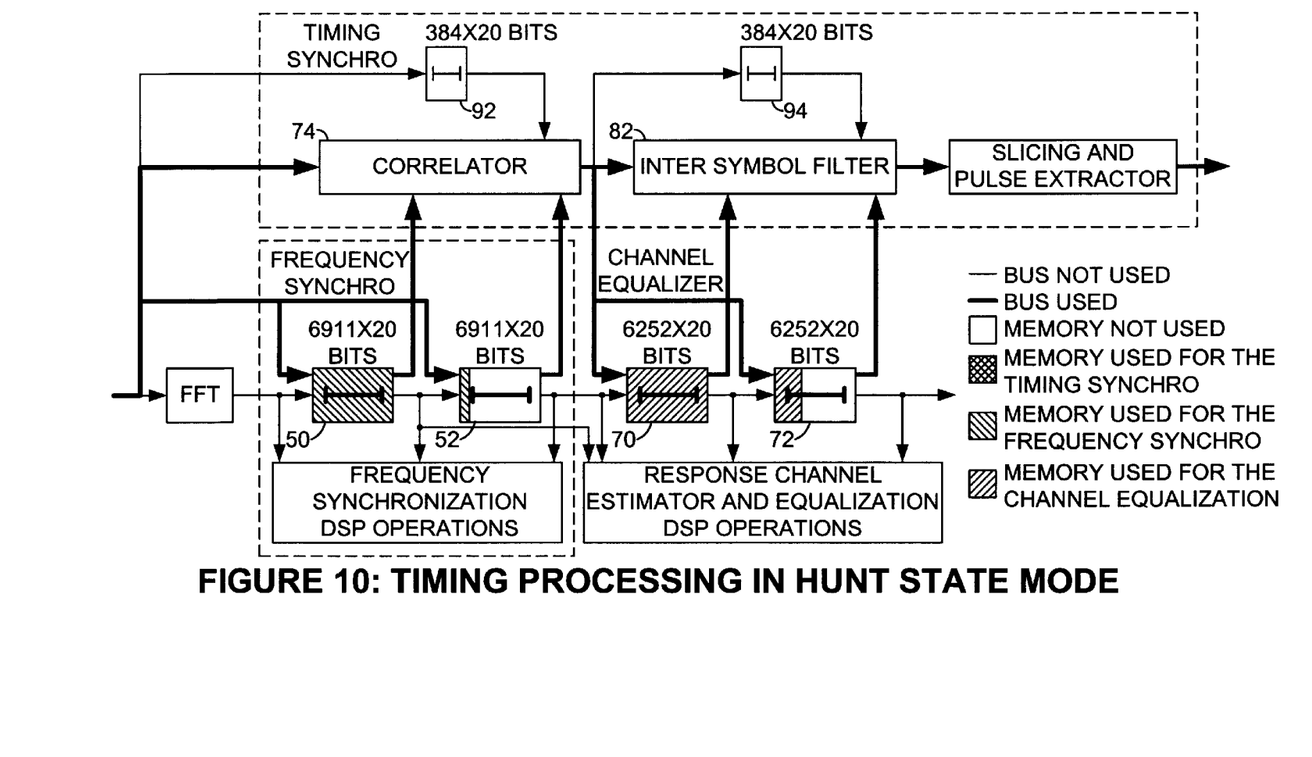
FIGS. 10 and 11 are block diagrams illustrating memory usage in accordance within the preferred embodiment of timing synchronization apparatus of the present invention.

The correlator 74 performs the correlation between the delayed version of the noisy-like OFDM signal and its complex conjugate. In HUNT state, the correlator considers all the signal and gets the direct samples from its input and the delayed version of the signal from the Frequency Synchronization unit memories 52, 54 (FIG. 10). In the ZOOM state, the correlator considers only subset of the signal, subset defined by the zoom window and gets direct samples from its input and its delayed signal from its internal small buffer.

Figure 13:
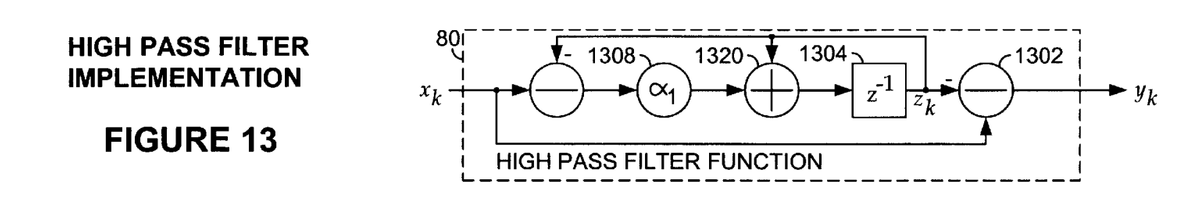
FIG. 13 is a schematic block diagram of a high pass filter used in time synchronization.

After the correlator unit 74, the high pass filter unit 80 consists of an intra symbol recursive low pass filter which extracts the average level of the complex product signal and a subtractor which subtracts the average level from the complex input signal. Referring to FIG. 13, the high pass filter comprises a subtractor 1302 for subtracting the input signal from an averaged version of the input signal, the averaged value being provided by a delay element 1304 which provides an output both to subtractor unit 1302 and to a further subtractor unit 1306 coupled to receive the input signal and providing a difference value to a constant multiplier $\alpha_1$($\frac{1}{8192}$ in 2 K mode and $\frac{1}{32768}$ in 8 K mode) 1108, the scaled version being provided to an adder 1310 where it is added with the output of delayed unit 1304, thereby providing a long term average complex input signal.

The high pass filter unit 80 is followed by the inter symbol IIR filter unit 84 which suppresses noise to produce a recognizable pulse. This filter works on the full symbol (HUNT mode), or a subset (ZOOM mode) and implements the following equation from symbol to symbol for incoming complex samples:

$$y_k(l+1) = \alpha_2(x_k(l+1) - y_k(l)) + y_k(l)$$

Where k represents the temporal index and l the symbol number.

Figures 14, 15:
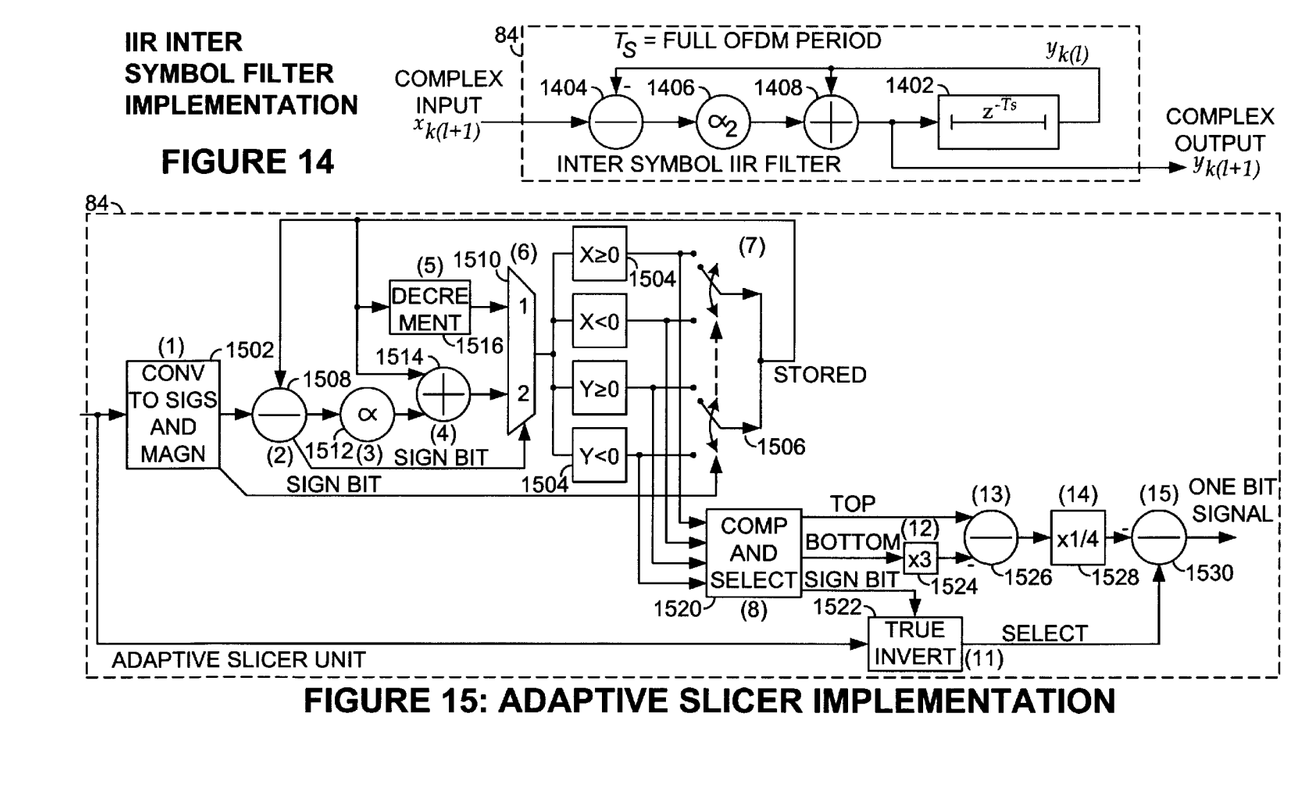
FIG. 14 is a schematic block diagram of an inter symbol filter used in the timing synchronization.
FIG. 15 is a schematic block diagram of an adaptive slicer used in the timing synchronization.

Referring to FIG. 14, the intersymbol IIR filter unit 82 comprises a delay line 1402 having a full one symbol delay, representing the active OFDM symbol pulse and the guard interval. The output of the delay is applied to a subtractor 1404 where it is subtracted from the input signal, the difference version being scaled by a factor $\alpha_2$, the scaled signal being added in an adder 1408 to the output from delay unit 1402, the output from the adder being applied to the input of delay unit 1402 and also being provided as an output signal.

The delay line is organized as a first buffer 70, 72 (FIG. 10) in the HUNT mode of 10K. In the ZOOM mode (FIG. 11) the buffer is organised as a buffer 94 of 384 words, each of 20 bits.

Referring back to FIG. 6, the shape of the pulse from the filters may not be optimum because there may be local oscillator frequency error in the down-converter. Such an error causes the complex pulse to be rotated from its nominal position on the real axis to another position in the Argand diagram, so that the argument of the pulse can take any value. In addition, the modulus of the pulse can vary, and the shape of the pulse can vary in view of multipath in the propagation. The basis of the method shown in FIG. 6 is that, if the plane of the argument of the symbol pulse is close to the real or imaginary axis, than that signal component represents a good approximation to the signal. Thus, referring to FIG. 15, the input signal is converted to a sign and magnitude value in converter 1502, and the output is applied via a filtering mechanism to registers 1504 storing the magnitude values on the 4 axes. The sign bit from converter 1502 controls switches 1506 to select either the negative or positive part of the axes for application to a subtractor 1508 where the stored value is compared with the input signal, the sign of the comparison being applied to a multiplexer unit 1510. The output of the subtractor 1508 is applied to a scaler 1512 and thence to an adder 1514 where the scaled input signal is added to the stored value, and the updated value or the previous stored value is chosen by multiplexer 1510, in accordance with the result of the subtraction in unit 1508. A decrementing circuit 1516 is provided which subtracts 1 from the stored magnitude every 512 clock cycles at 10 MHz in 2 K mode and every 2,048 clock cycles at 9 MHz in 8 K mode. The scaler 1512 scales by a factor ¼.

The four stored values representative of the peak for the four axes ($X \geq 0$, $X<0$, $Y \geq 0$, $Y<0$) are compared at 1520 and the greater axis in magnitude (Top) is chosen. This determines whether the real or imaginary component has the greater peak magnitude and controls the selection either of all the real samples from the input if $X \geq 0$ or $X<0$ axes are chosen or all are imaginary otherwise. Also the sign of the greater axis in magnitude is used at 1522 to control the inversion of the selected input samples in such a way that the output of the True/Invert unit always provides a positive rectified value. At the same time, the positive axis ($X \geq 0$ or $Y \geq 0$) with the greater magnitude (Top) has subtracted three times (12) the value of the axis labelled Bottom, this axis corresponding to the opposite direction of the axis Top (units 1524, 1526), the result of the subtraction being divided by 4 at 1528. This result is then subtracted at 1530 from the rectified selected input sample and the sign bit of the subtraction provides a One Bit Signal to the pulse processor unit 86.

Figures 16, 18:
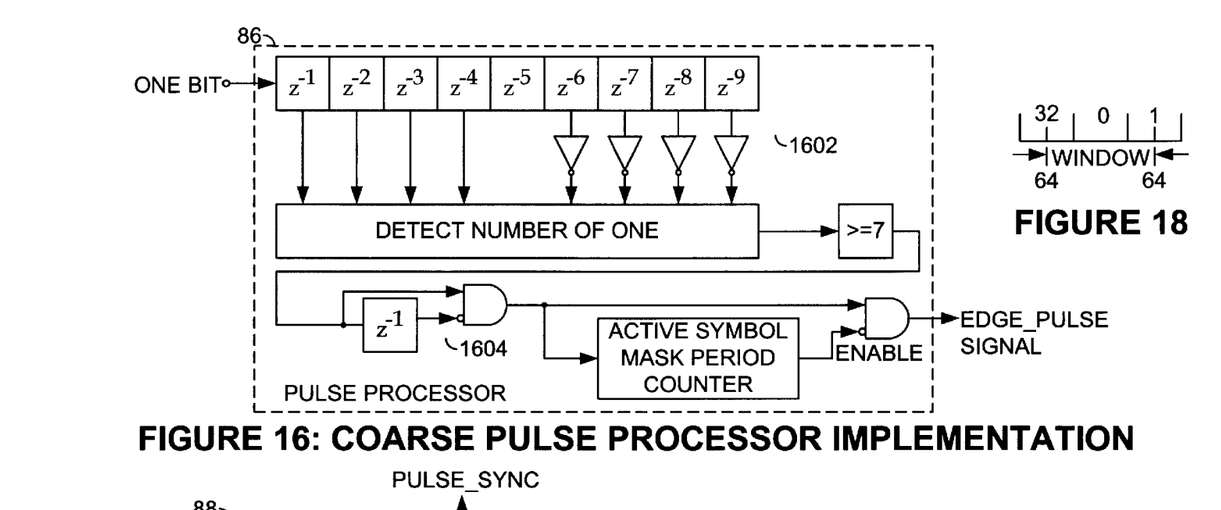
FIG. 16 is a schematic block diagram of a pulse processor used in the timing synchronization.
FIG. 18 is a window associated with FIG. 17.

The pulse processor unit 86 takes the one bit signal coming from the adaptive slicer unit and produces a single short pulse from the rising edge of the symbol pulse as shown in FIG. 16. A majority logic 1602 detects the rising edge of the input pulse, and produces by a monostable 1604, a pulse in the region of the rising edge of the pulse, which is provided as an output single clock pulse. The pulse processor logic also prevents any further pulses from being conveyed to the output until the region of the next symbol pulse has been reached. To do so, an Active Period Symbol counter 1606 is free-incrementing up to its maximum. Only when the free-running counter has reached its maximum is a pulse from monostable 1604 presented to the output (the Edge-Pulse signal). This single pulse also reinitiates the counting process of the free-running counter. When the maximum is not reached, any new incoming single pulse is ignored, thus preventing single pulses to be closer than the active period TA.

The symbol counter unit 88 receives the Edge_Pulse signal from the pulse processor unit 86. The symbol counter unit 88 comprises (FIG. 17) an upper counter 1702 for receiving Edge_Pulse signal, and a lower counter 1704 receiving a clock signal. Upper counter 1704 provides a Zoom-Window signal for defining a zoom window in the ZOOM mode. Upper counter 1704 provides a Pulse Sync signal when timing lock is achieved.

Figure 17:
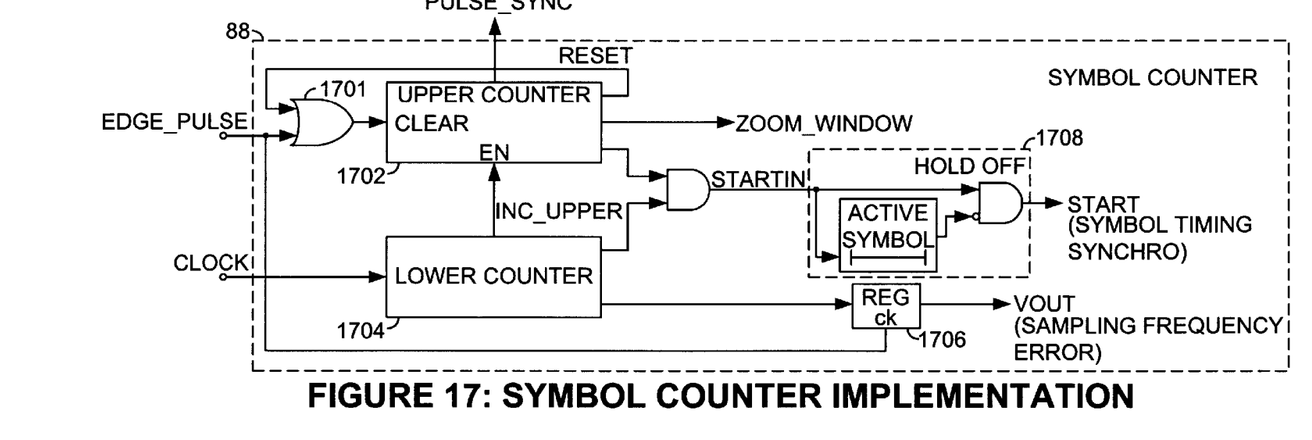
FIG. 17 is a schematic block diagram of a symbol counter used in the timing synchronization.

The lower counter 1704 completes a whole number of count cycles in a symbol period, while the upper counter advance by one each time the lower stage completes a count cycle. The lower stage counts over the range 0 to 127, simply incrementing at every incoming CLK18 clock pulse and never reset. At every Edge_Pulse, the lower counter content is stored in a register 1706. The output of this register Vout is interpreted as a signal for controlling the frequency of the control oscillator.

The upper counter 1704 counts from 0 to 32, 0 to 33, 0 to 35 or 0 to 39 in 2K mode while from 0 to 131, 0 to 135, 0 to 143 or 0 to 159 in 8K mode depending on whether the guard interval is ¹⁄₃₂, ¹⁄₁₆, ⅛ or ¼. In Zoom state mode, this upper counter is only reset when it is completing its count range, whereas in Hunt state mode, this upper counter is reset when it is completing its count range or when a PULSE_START occurs.

The Zoom Window provided by the signal Zoom_Window is defined by the upper counter value which is specified in Table 1. This Zoom Window is only relevant for the synchronization process only in Zoom state mode.

The PULSE_SYNC signal specified if the demodulator is properly locked to the beginning of the OFDM symbol otherwise not. This signal is updated by the Edge_Pulse signal. In Zoom state mode, only if the upper counter content and the lower counter are in the range specified in Table 1 when a Edge_Pulse occurs than the PULSE_SYNC signal is asserted high other low. When in HUNT state mode, only if the upper counter content is zero when a Edge_Pulse occurs than the PULSE_SYNC signal is asserted high otherwise low.

The signals Zoom_Window and Pulse_Sync are processed in a counter means (not shown) so that a change of state from HUNT to ZOOM only occurs afer ALPHA consecutive Pulse_Sync signals are provided (or Pulse_Sync exists in ALPHA consecutive symbol periods). Similarly a change of state from ZOOM to HUNT only occurs after loss of the Signal Zoom_Window for DELTA consecutive symbol intervals. As an example the counter means is arranged such that both ALPHA and DELTA are equal to three.

TABLE 1

| | | Δ | ¹⁄₃₂ | ¹⁄₁₆ | ⅛ | ¼ |
|---|---|---|---|---|---|---|
| 2K mode | upper counter (Zoom Window range) | | 32 to 1 | 33 to 1 | 35 to 1 | 39 to 1 |
| | lower counter | | lower ≧ 64 when upper = 32 lower < 64 when upper = 1 | lower ≧ 64 when upper = 33 lower < 64 when upper = 1 | lower ≧ 64 when upper = 35 lower < 64 when upper = 1 | lower ≧ 64 when upper = 39 lower < 64 when upper = 1 |
| 8K mode | upper counter (Zoom Window range) | | 131 to 1 | 136 to 1 | 145 to 1 | 159 to 1 |

TABLE 1-continued

| Δ | 1/32 | 1/16 | 1/8 | 1/4 |
| --- | --- | --- | --- | --- |
| lower counter | lower ≧ 64 when upper = 131 lower < 64 when upper = 1 | lower ≧ 64 when upper = 135 lower < 64 when upper = 1 | lower ≧ 64 when upper = 145 lower < 64 when upper = 1 | lower ≧ 64 when upper = 159 lower < 64 when upper = 1 |

When in 2K mode the upper stage value is 2, 4, 8 or 16 for a guard interval of 1/32, 1/16, 1/8 or 1/4 then the starting signal is asserted high otherwise low while in 8K mode only, the upper stage value is 8, 16, 32 or 64 for a guard interval of 1/32, 1/16, 1/8 or 1/4 then the starting signal is asserted high. Hold Off logic 1708 prevents two consecutive START signals to be present within a time period less than an active period.

Thus in operation, in the initial hunt mode, the edge of the pulse from filter 82, 84 is detected in slicer 84, to generate in pulse processor 86 and Edge_Pulse signal which is applied to OR gate 1701 of symbol counter 88. This clears counter 1702, to provide a START signal from Hold Off circuit 1708. In addition a Pulse_Sync signal is generated to indicate lock has been achieved, but this is not available for ALPHA consecutive symbol intervals in order that a reliable lock is achieved.

The Edge_Pulse is also applied to register 1706 to set the register at the current value of the lower counter 1704, representing sampling frequency error. Thus the clock oscillator 8 is controlled in a control loop, such that a value of 0 is a large negative signal and a value of 127 is a large positive signal. A count of 64 gives zero frequency error, so that ultimately the loop will settle so that the average position of the incoming symbol pulses coincides with the count 64 in the lower counter. Thus coarse lock is achieved rapidly from the upper counter, and fine lock gradually by the action of the control loop.

The lower counter 1704 received the 18 MHz clock signal. The count of upper counter 1702 is adjusted for the particular mode. Thus when coarse lock has been achieved, and the Pulse_Sync signal is stable, a signal Zoom_Window is issued by counter 1702. Referring to Table 1, this signal occupies three count values of the upper counter, e.g. 32, 0, 1 for the 2K mode, 1/32 guard interval. In addition, this window is generated only when the lower counter is above its mid point of 64 in the interval 32 and below its mode point in interval 1, as indicated in FIG. 18. In the zoom mode, as previously indicated, the timing circuitry operates on just 3 symbols, a fraction of the incoming symbols, and therefore the memory requirements is reduced to buffers 90, 92. Timing lock is retained as long as the Edge_pulse signal continues to arrive within the window defined as shown in FIG. 18.

What is claimed is:

1. An apparatus for demodulating digital video broadcast signals comprising data modulated on a multiplicity of spaced carrier frequencies, comprising:

conversion means for converting the broadcast signal to a series of digital samples in complex format;

transform means for analyzing digital sample values to provide a series of data symbol values for each carrier frequency;

signal processing means including channel equalization means for receiving signal values and providing an output for decoding;

automatic frequency control means for controlling the frequencies of the digital sample values applied to said transform means;

timing synchronization means for synchronizing the transform means with symbol periods of the broadcast signal, including correlation means for receiving the digital signal values and comprising delay means having a time period equal to a symbol period, and multiplier means for receiving the digital signal values and a version thereof delayed by said delay means, to form a complex product signal, and means for processing the complex product signal to derive timing synchronization pulses;

wherein the timing synchronization means is operable in an initial hunt mode for analyzing the digital sample values over a relatively wide timing range to establish synchronization, and then operable in a zoom mode for analyzing the digital sample values over a relatively narrow range where a synchronization point is expected.

2. An apparatus according to claim 1, wherein the relatively wide timing range is a full symbol period.

3. An apparatus according to claim 1, wherein the timing synchronization means includes means for detecting an edge of said complex product signal, and means for selecting the magnitude of the edge along four axes (±X, ±Y) which best represents the edge.

4. An apparatus according to claim 3, wherein the timing synchronization means includes means for detecting an edge of the complex product signal, and providing an edge signal, and counter means responsive to the edge signal and a clock signal for counting symbol intervals and for providing a ZOOM window signal, in response to which the timing synchronization means operates in the ZOOM mode.

5. An apparatus according to claim 4, wherein the ZOOM mode, the counter means is operative to maintain the ZOOM window signal if the edge signal is located within a predetermined number of symbol intervals from an expected synchronization point.

6. An apparatus according to claim 5, wherein the counter means is operative to provide signals indicative of edge detection, and including means responsive to the signals existing over a predetermined plurality of symbol periods for permitting transition between hunt and zoom modes.

7. An apparatus according to claim 4, wherein the counter means is operative to provide signals indicative of edge detection, and including means responsive to the signals existing over a predetermined plurality of symbol periods for permitting transition between hunt and zoom modes.

8. An apparatus according to claim 7, wherein in the hunt mode, the timing synchronization means is operative to employ memory reserved for at least one of automatic frequency control and channel equalization.

9. An apparatus according to claim 1, wherein the timing synchronization means includes means for detecting an edge of the complex product signal, and providing an edge signal, and counter means responsive to the edge signal and a clock signal for counting symbol intervals and for providing a ZOOM window signal, in response to which the timing synchronization means operates in the ZOOM mode.

10. An apparatus according to claim 1, wherein in the hunt mode, the timing synchronization means is operative to employ memory reserved for at least one of automatic frequency control and channel equalization.

11. A method of demodulating digital video broadcast signals comprising data modulated on a multiplicity of spaced carrier frequencies, comprising the steps of:

converting the broadcast signals to a series of digital sample values in complex format, transforming the digital sample values to a series of data symbol values for each carrier frequency;

synchronizing a transform means with the symbol periods of the broadcast signal, including correlating the digital signal values by multiplying the digital signal values and a version thereof delayed by a time period equal to the active symbol period, to form a complex product signal, and processing the complex product signal to derive timing synchronization pulses, wherein the timing synchronization is carried out in an initial hunt mode, analyzing said digital sample values over a relatively wide timing range to establish synchronization; and the timing synchronization then being carried out in a zoom mode, analyzing the digital sample values over a relatively narrow range about a synchronization point, and processing the data symbol values, including channel equalization the data symbol values to provide an output for decoding, and automatically controlling the frequencies of the digital sampling signals applied to said transform means.

12. A method according to claim 11, wherein the relatively wide timing range is a full symbol period.

13. A method according to claim 11, including detecting an edge of the complex product signal.

14. A method according to claim 13, including selecting the magnitude of the edge along four axes (±X, ±Y) which best represents the edge.

15. A method according to claim 14, including counting a clock signal to provide symbol intervals from the occurrence of the edge and providing a Zoom Window signal extending over a predetermined number of symbol intervals.

16. A method according to claim 15, wherein the Zoom state is maintained if the edge remains located with the Zoom Window.

17. A method according to claim 16, wherein a transition between modes is made only after a predetermined number of symbol periods have elapsed in which conditions exist for making the transition.

18. A method according to claim 13, including counting a clock signal to provide symbol intervals from the occurrence of the edge and providing a Zoom Window signal extending over a predetermined number of symbol intervals.

19. A method according to claim 13, wherein a transition between modes is made only after a predetermined number of symbol periods have elapsed in which conditions exist for making the transition.

20. A method according to claim 19, wherein in the hunt mode, an area of memory is employed which is otherwise reserved for at least one of automatic frequency control and channel equalization.

21. A method according to claim 11, wherein in the hunt mode, an area of memory is employed which is otherwise reserved for at least one of automatic frequency control and channel equalization.

* * * * *